US010292207B2

(12) United States Patent
Fassbender et al.

(10) Patent No.: US 10,292,207 B2
(45) Date of Patent: May 14, 2019

(54) HEATED STEERING WHEEL

(71) Applicant: FORD GLOBAL TECHNOLOGIES, LLC, Dearborn, MI (US)

(72) Inventors: Martin Fassbender, Buschhoven NRW (DE); Timothy Scott, Benfleet (GB); Uwe Thiesmeyer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1292 days.

(21) Appl. No.: 14/056,274

(22) Filed: Oct. 17, 2013

(65) Prior Publication Data
US 2014/0110388 A1 Apr. 24, 2014

(30) Foreign Application Priority Data
Oct. 23, 2012 (GB) .................................. 1219004.7

(51) Int. Cl.
*H05B 3/00* (2006.01)
*B62D 1/06* (2006.01)
(52) U.S. Cl.
CPC ........... *H05B 3/0014* (2013.01); *B62D 1/065* (2013.01)
(58) Field of Classification Search
CPC ....... H05B 3/00; H05B 3/0004–3/0042; H05B 3/34; H05B 3/56; H05B 2203/017;
(Continued)

(56) References Cited

U.S. PATENT DOCUMENTS 1,062,745 A * 5/1913 Smith ...................... H05B 3/16
219/204
2,662,961 A * 12/1953 Sargent .................. B62D 1/065
174/86
(Continued)

FOREIGN PATENT DOCUMENTS

CN 2199893 Y 6/1995
CN 2625237 Y 7/2004
(Continued)

OTHER PUBLICATIONS

European Patent Office, Search Report for the corresponding GB Patent Application No. GB1219004.7 dated Jan. 29, 2013.
(Continued)

*Primary Examiner* — Ibrahime A Abraham
*Assistant Examiner* — Gyounghyun Bae
(74) *Attorney, Agent, or Firm* — Frank Lollo; Brooks Kushman, P.C.

(57) ABSTRACT

A heated steering wheel having a first electrical circuit including, in series, a first heating element disposed adjacent to a 3 o'clock of the wheel, a second heating element disposed adjacent to a 9 o'clock position of the wheel, and a positive temperature coefficient thermistor heated by one of the first and second heating elements; and a second electrical circuit including, in series, a third heating element disposed at a 6 o'clock position of the wheel, a fourth heating element disposed at a 12 o'clock position of the wheel, and a negative temperature coefficient thermistor heated by one of the first and second heating elements. The flow of electricity through the second electrical circuit is delayed until after electricity has flowed through the first electrical circuit warm those portions of the wheel to a desired temperature.

18 Claims, 1 Drawing Sheet

(58) Field of Classification Search
CPC ...... H05B 2203/02; H05B 3/14; H05B 3/342; G05D 23/2401; G05D 23/2453; H01C 1/1406

USPC .................. 219/481–505; 338/22 R, 502

See application file for complete search history.

(56) References Cited

U.S. PATENT DOCUMENTS

| | | | | |
|---|---|---|---|---|
| 3,557,342 | A * | 1/1971 | Chambers | G05D 23/1909 219/499 |
| 3,617,800 | A * | 11/1971 | Ishikawa | H04N 9/29 315/8 |
| 3,619,703 | A * | 11/1971 | Yamashita | H04N 9/29 315/8 |
| 3,671,860 | A * | 6/1972 | Kettler | G01R 19/30 324/103 P |
| 3,710,062 | A * | 1/1973 | Peters, Jr. | F24C 7/02 219/502 |
| 3,816,702 | A * | 6/1974 | Green | H03L 1/04 219/209 |
| 4,163,437 | A * | 8/1979 | Notaras | F02P 1/083 123/149 A |
| 4,631,976 | A * | 12/1986 | Noda | B62D 1/065 219/204 |
| 4,730,097 | A * | 3/1988 | Campbell | B60S 1/026 219/203 |
| 4,780,598 | A * | 10/1988 | Fahey | H01C 7/027 219/491 |
| 4,849,611 | A * | 7/1989 | Whitney | H05B 3/141 219/538 |
| 5,748,429 | A * | 5/1998 | Peterson | G01K 15/00 219/484 |
| 6,093,908 | A * | 7/2000 | Haag | B62D 1/065 219/204 |
| 6,172,342 | B1 * | 1/2001 | Khafagy | B60H 1/00292 219/202 |
| 6,233,127 | B1 * | 5/2001 | Shimazawa | B82Y 10/00 360/319 |
| 6,268,588 | B1 * | 7/2001 | Hazebrouck | B62D 1/065 219/204 |
| 6,392,195 | B1 * | 5/2002 | Zhao | B62D 1/065 219/204 |
| 6,509,552 | B1 * | 1/2003 | Roske | B62D 1/065 165/41 |
| 6,512,202 | B2 * | 1/2003 | Haag | B62D 1/065 219/204 |
| 6,727,467 | B1 * | 4/2004 | Hadzizukic | B62D 1/065 219/204 |
| 7,741,582 | B2 * | 6/2010 | Howick | B60N 2/5678 219/202 |
| 7,908,941 | B2 * | 3/2011 | Menaldo | B62D 1/065 219/204 |
| 7,954,399 | B2 * | 6/2011 | Rubboli | B62D 1/046 200/61.57 |
| 8,188,406 | B2 * | 5/2012 | Asami | B62D 1/065 219/202 |
| 8,278,602 | B2 * | 10/2012 | Yoneyama | B62D 1/065 219/204 |
| 2002/0033389 | A1 * | 3/2002 | Sugiyama | B62D 1/065 219/204 |
| 2002/0166407 | A1 | 11/2002 | Germuth-Loffler et al. | |
| 2003/0006228 | A1 * | 1/2003 | Nagatomo | H05B 1/0236 219/494 |
| 2003/0089700 | A1 * | 5/2003 | Chang | A45D 1/04 219/505 |
| 2003/0111453 | A1 | 6/2003 | Haag et al. | |
| 2003/0178409 | A1 * | 9/2003 | Kempf | B25F 5/02 219/494 |
| 2004/0155020 | A1 | 8/2004 | Worrell et al. | |
| 2005/0017670 | A1 * | 1/2005 | Han | H02P 1/445 318/781 |
| 2005/0072772 | A1 * | 4/2005 | Livingstone | B01D 53/228 219/494 |
| 2006/0054616 | A1 * | 3/2006 | Ptasienski | B29C 45/2737 219/543 |
| 2006/0163232 | A1 * | 7/2006 | Hollander | B62J 33/00 219/202 |
| 2008/0127771 | A1 * | 6/2008 | Stoll | B62D 1/065 74/552 |
| 2009/0184108 | A1 * | 7/2009 | O'Connor | H05B 3/145 219/548 |
| 2009/0302954 | A1 * | 12/2009 | Chen | H03K 3/011 331/66 |
| 2010/0071502 | A1 * | 3/2010 | Yasuda | B62D 1/065 74/552 |
| 2010/0096922 | A1 * | 4/2010 | Kishimoto | B60L 3/0046 307/9.1 |
| 2011/0068696 | A1 * | 3/2011 | van de Ven | H05B 33/083 315/152 |
| 2011/0157755 | A1 * | 6/2011 | Honkura | H01M 10/4235 361/93.8 |
| 2011/0246028 | A1 * | 10/2011 | Lisseman | B60K 28/066 701/45 |
| 2012/0118868 | A1 * | 5/2012 | Kim | B62D 1/065 219/204 |
| 2012/0312796 | A1 * | 12/2012 | Cho | B62D 1/065 219/204 |
| 2012/0313654 | A1 * | 12/2012 | Chen | G01R 19/32 324/713 |
| 2014/0028764 | A1 * | 1/2014 | Aznoe | B41J 2/17593 347/88 |
| 2015/0102737 | A1 * | 4/2015 | Dilger | H05B 33/0806 315/186 |

FOREIGN PATENT DOCUMENTS

GB           248852        3/1926
JP        2010214140 A     9/2010

OTHER PUBLICATIONS

Chinese Office Action from corresponding CN Application No. 201310495396.7, dated Nov. 2, 2016.

* cited by examiner

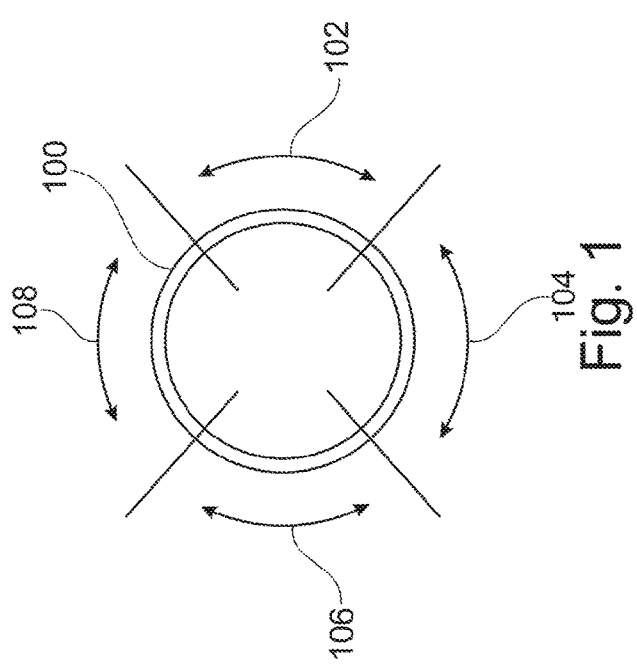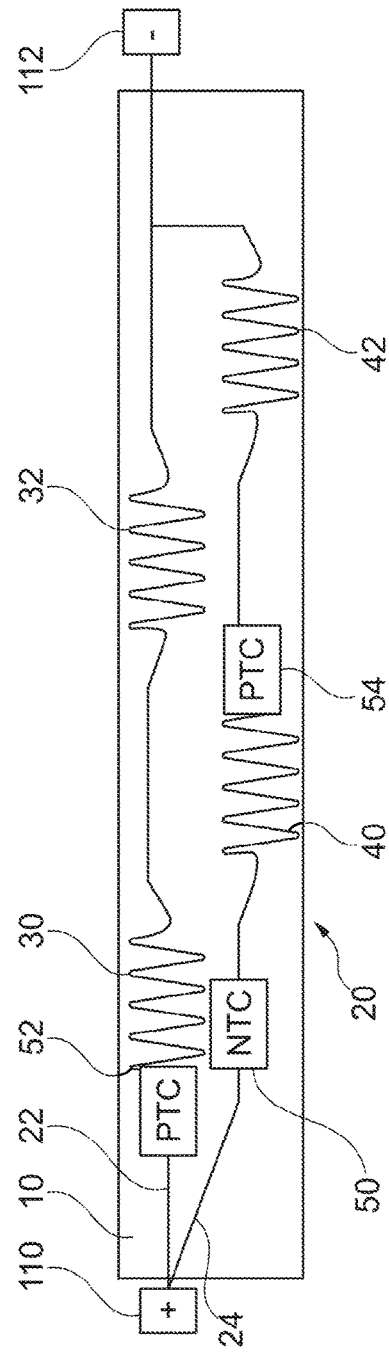

HEATED STEERING WHEEL

CROSS-REFERENCE TO RELATED APPLICATIONS

This application claims foreign priority benefits under 35 U.S.C. § 119(a)-(d) to Great Britain Patent Application No. 1219004.7, filed Oct. 23, 2012 the disclosure of which is hereby incorporated in its entirety by reference herein.

TECHNICAL FIELD

The present invention relates to steering wheels for vehicles. In particular, but not exclusively, the invention relates to apparatus and methods for heating a steering wheel.

BACKGROUND

It is known to heat the steering wheel of a vehicle for the comfort of the driver. Known systems for heating steering wheels typically comprise a heater mat which includes one or more heater elements, a temperature sensor and electronic controls. The heater elements are arranged in series along a single electrical circuit. Typically, the whole rim of the steering wheel is wrapped with a heater mat, to provide a comfortable temperature on the entire surface of the rim.

A clockspring is a rotary electrical connector which allows a vehicle's steering wheel to turn while still making an electrical connection between the steering wheel airbag and/or the vehicle's horn and other devices and the vehicle's electrical systems. The clockspring is located between the steering wheel and the steering column.

The limiting factor in heating up a steering wheel in a short period of time is the maximum electrical energy (the product of the voltage and current) which can flow through the clockspring. For a fixed value of maximum electrical energy, the greater the area being heated the longer the heating will take. As a result, known heated steering wheel systems suffer from a relatively long heating up time.

In other known systems, this problem has been addressed by only partially covering the steering wheel rim with heating elements. Typically, it is the 3 o'clock and 9 o'clock regions of the steering wheel that are heated as these are the portions of the steering wheel that are most contacted by the driver. However, the other portions (at the 6 o'clock and 12 o'clock regions) are not heated at all and the driver does contact these portions, such as during a turning maneuver. This is inconvenient for the driver and may even encourage a poor style of steering wheel handling.

It is desirable to provide an alternative heated steering wheel which provides at least some heating of the entire rim of the steering wheel while heating at least the most used portions of the rim in a practically short length of time.

A thermistor is a known type of resistor whose resistance varies significantly with temperature. For a positive temperature coefficient (PTC) thermistor, the resistance is typically low at ambient temperatures and increases with increasing ambient temperature. For a negative temperature coefficient (NTC) thermistor, the resistance is high at ambient temperatures and decreases with increasing ambient temperature.

SUMMARY

According to a first aspect of the present invention there is provided a heated steering wheel comprising:

a steering wheel having a rim;

a first electrical circuit including at least one heating element and provided at at least a first portion of the steering wheel rim;

a second electrical circuit including at least one heating element and provided at at least a second portion of the steering wheel rim; and control means for controlling the flow of electricity through at least the second electrical circuit, wherein the control means is configured to delay or limit the flow of electricity through the second electrical circuit until after electricity has flowed through the first electrical circuit for a period of time.

It is to be understood that the first and second electrical circuits may be parallel circuits of a larger electrical circuit.

The control means may be configured to delay any flow of electricity through the second electrical circuit for a period of time. Alternatively, the control means may be configured to limit the flow of electricity through the second electrical circuit for a period of time and, during this time, the flow of electricity through the second electrical circuit may increase from a zero or low flow.

The heated steering wheel may include a temperature sensor for sensing a temperature associated with the first electrical circuit. The control means may be configured to substantially delay the flow of electricity through the second electrical circuit until the associated temperature reaches a predetermined value. Alternatively, the control means may be configured to limit the flow of electricity through the second electrical circuit by an amount which is dependent on the sensed temperature.

The associated temperature may be the temperature at the surface of the first portion of the steering wheel rim. Alternatively, the associated temperature may be the temperature at the at least one heating element.

Alternatively, the control means may be adapted to measure at least one of a change in voltage and current within the first electrical circuit and to determine a corresponding temperature value for a heating element of the first electrical circuit. The control means may be configured to substantially prevent or limit the flow of electricity through the second electrical circuit until the determined temperature reaches a predetermined value.

Alternatively or in addition, the control means may include a timer device. The control means may be configured to substantially prevent or limit the flow of electricity through the second electrical circuit until the time period has elapsed.

The first portion of the steering wheel rim may correspond to the 3 o'clock region of the rim.

The first electrical circuit may include at least one heating element provided at a third portion of the steering wheel rim. The third portion of the steering wheel rim may correspond to the 9 o'clock region of the rim.

The second portion of the steering wheel rim may correspond to the 6 o'clock region of the rim.

The second electrical circuit may include at least one heating element provided at a fourth portion of the steering wheel rim. The fourth portion of the steering wheel rim may correspond to the 12 o'clock region of the rim.

The first electrical circuit may include a plurality of heating elements arranged in series.

The second electrical circuit may include a plurality of heating elements arranged in series.

The heated steering wheel may include at least one thermistor. The control means may comprise an NTC thermistor provided within the second electrical circuit.

The NTC thermistor may provide the temperature sensor. The NTC thermistor may be provided adjacent to a first heating element of the first electrical circuit.

The control means may include a transistor adapted to allow or prevent or limit the flow of electricity through the second electrical circuit. The NTC thermistor may be electrically connected to the base terminal of the transistor.

The heated steering wheel may include a PTC thermistor provided within the first electrical circuit.

The heated steering wheel may include a PTC thermistor provided within the second electrical circuit.

Alternatively, the control means may comprise a normally closed switch. The switch may be adapted to open after electricity has flowed through the first electrical circuit for the period of time.

According to a second aspect of the present invention there is provided a method of heating a steering wheel, the method comprising the steps of:

providing a first electrical circuit including at least one heating element at at least a first portion of the steering wheel rim;

providing a second electrical circuit including at least one heating element at at least a second portion of the steering wheel rim;

allowing the flow of electricity through the first electrical circuit;

delaying or limiting the flow of electricity through the second electrical circuit for a period of time; and then allowing the flow of electricity through the second electrical circuit.

The method may include sensing a temperature associated with the first electrical circuit. The method may include substantially preventing the flow of electricity through the second electrical circuit until the associated temperature reaches a predetermined value.

Alternatively or in addition, the method may include delaying or limiting any flow of electricity through the second electrical circuit until a predetermined time period has elapsed.

The method may include providing an NTC thermistor within the second electrical circuit.

The method may include providing the NTC thermistor adjacent to a first heating element of the first electrical circuit.

The method may include providing a PTC thermistor within the first electrical circuit.

The method may include providing a PTC thermistor provided within the second electrical circuit.

BRIEF DESCRIPTION OF THE DRAWINGS

Embodiments of the present invention will now be described, by way of example only, with reference to the accompanying drawings in which:

FIG. 1 is a front view of a steering wheel rim; and

FIG. 2 is a heater mat and circuit diagram of a heating system for the steering wheel rim of FIG. 1.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a steering wheel rim 100. The rim 100 can be considered to have four portions: a first portion 102 which is the 3 o'clock region; a second portion 104 which is the 6 o'clock region; a third portion 106 which is the 9 o'clock region; and a fourth portion 108 which is the 12 o'clock region.

FIG. 2 shows a heater mat 10 and heating system 20 as described below. The heater mat 10 is applied to the outer surface of the rim 100 so that the entire rim 100 (all four portions) is covered by the mat 10. The heating system 20 is connected to the positive 110 and negative 112 terminals of the vehicle battery. For clarity, the terminals are shown as separated in FIG. 2 but, when the heater mat 10 has been applied to the rim 100, the two ends of the heater mat 10 will be adjacent to each other and so the heating system 20 is connectable to terminals provided at a battery.

As shown in FIG. 2, the heating system 20 comprises a first electrical circuit 22 and a second electrical circuit 24. Each of the first and second electrical circuits includes two heating elements arranged in series. The heating elements are physically arranged so that, when the heater mat 10 has been applied to the rim 100: the first heating element 30 of the first electrical circuit 22 is located at the first portion 102; the first heating element 40 of the second electrical circuit 24 is located at the second portion 104; the second heating element 32 of the first electrical circuit 22 is located at the third portion 106; and the second heating element 42 of the second electrical circuit 24 is located at the fourth portion 108.

Control means is provided for controlling the flow of electricity through each electrical circuit. In the embodiment shown, this is in the form of a number of thermistors. Also, a switch (not shown) prevents any flow of electricity between the battery terminals and through either circuit when the vehicle is not operating.

A first thermistor 50 is an NTC thermistor provided in the second electrical circuit 24. The thermistor 24 therefore initially (when the vehicle has not been operating for a period of time) has a high resistance under ambient temperatures. A second thermistor 52, which is a PTC thermistor, is provided in the first electrical circuit 22. The thermistor 24 therefore initially has a low resistance under ambient temperatures.

Therefore, when the vehicle is started, electricity flows through the first electrical circuit 22 but is substantially prevented from flowing through the second electrical circuit 24 due to the high resistance of the first thermistor 50. Consequently, the heating elements 30, 32 of the first electrical circuit 22 heat up rapidly as they receive all the available electrical energy. Heat is transferred to the first and third portions of the rim 100.

As shown in FIG. 2, the first thermistor 50 is located at the heater mat 10 adjacent to the first heating element 30. Therefore, the first thermistor 50 also receives heat from the first heating element 30 and, as it heats up, its resistance decreases. This causes the flow of electricity in the second electrical circuit 24 to gradually increase. Consequently, the heating elements 40, 42 of the second electrical circuit 24 heat up, albeit at a slower rate. Heat is transferred to the second and fourth portions of the rim 100. It should be noted that the first thermistor 50 is effectively providing a temperature sensor for sensing a temperature associated with the first electrical circuit 22.

At the same time, the second thermistor 52 is also located at the heater mat 10 adjacent to the first heating element 30. Therefore, the second thermistor 50 also receives heat from the first heating element 30 and, as it heats up, its resistance increases. This causes the flow of electricity in the first electrical circuit 22 to gradually decrease. In turn, the second electrical circuit 24 receives more of the available electrical energy and the heating elements 40, 42 of the second electrical circuit 24 heat up at a higher rate.

A decrease in the flow of electricity in the first electrical circuit 22 will cause a reduction in the temperature of the first heating element 30. In turn, the resistance of the first thermistor 50 will vary accordingly. Therefore, the flow in each circuit will tend to stabilise. However, if configured incorrectly, the flow of electricity in either one of the electrical circuits may not be as desired. For instance, it is possible that the second electrical circuit 24, which now includes a thermistor of low resistance, receives a greater share of the available electrical energy than the first electrical circuit 22, which now includes a thermistor of high resistance.

To address this, the second electrical circuit 24 also includes a third thermistor 54, which is a PTC thermistor. This is located adjacent to the first heating element 40 of the first electrical circuit 22. Therefore, initially, the thermistor 54 has a low resistance and little effect of the flow of electricity in the second electrical circuit 24. However, as the second first element 40 heats up, the resistance of the third thermistor 54 increases. Therefore, when the flow in each circuit has stabilised, each of the first and second circuits will include a thermistor of higher resistance.

After a period of time, the two circuits will share the available electrical energy. The energy can be but need not be shared equally. Rather, the system can be configured to optimise comfort to the driver by the selection and arrangement of components (such as their proximity to the first heating element 30).

For instance, the driver will benefit from the rapid heating of the first and third portions 102, 106 of the rim 100, which are the portions of the steering wheel which are contacted the most. After the period of time, all portions of the steering wheel can be fairly comfortably contacted. However, the heating system 20 may be configured to maintain the first and third portions 102, 106 at a higher temperature than the second and fourth portions 104, 108.

In another embodiment (now shown), the second and third thermistors may be omitted. In such case, after the period of time, the second electrical circuit 24 will include a thermistor of low resistance while the second electrical circuit 24 will have practically no resistance. This may be configurable to provide the desired heating of the portions of the rim 100.

It may be desirable to avoid transmitting several amps of current through the thermistors. In an alternative embodiment, the control means could include a transistor adapted to allow or prevent or limit the flow of electricity through the second electrical circuit 24. The NTC thermistor 50 can be provided parallel to the second electrical circuit 24 and electrically connected to the base terminal of the transistor. When the NTC thermistor 50 heats up, its resistance decreases causing the flow of electricity to the base terminal of the transistor which causes the transistor to 'open' and allow flow in the second electrical circuit 24.

In alternative embodiments, there are many other forms of control means which may be utilised, many of which will involve standard electronics well known to a skilled person. For instance, the control means could be adapted to measure at least one of a change in voltage and current within the first electrical circuit 22 due to the change in resistance of the heating elements. The control means can then determine a corresponding temperature value for a heating element of the first electrical circuit 22. The control means can be configured to prevent or limit the flow of electricity through the second electrical circuit 24 until the determined temperature reaches a predetermined value. In this arrangement, physical temperature sensors can be omitted.

In another alternative embodiment, the control means could operate a normally closed switch in response to the sensed temperature (at the 3 o'clock and 9 o'clock positions of the steering wheel). The switch can be adapted to open after electricity has flowed through the first electrical circuit for the period of time. This would also involve standard electronics well known to a skilled person.

In known heating systems for steering wheels, the heat transferred from a driver's hands to the rim 100 is not utilised. This is because the flow of electricity in the single circuit is not dependent on the ambient temperature at a particular region of the rim 100. If a temperature sensor of the known system is affected by the heat transferred from the driver's hands, heating of the whole rim 100 will be reduced (or just heating of the first and third portions but the other portions are not heated anyway). Neither of these outcomes is necessarily desirable.

However, for the invention, the driver's hands will initially be at the first and third portions and the heat transferred will only speed up the heating of these portions and the subsequent switch to heating the second and fourth inventions.

The present invention therefore provides heating of the entire rim 100 of the steering wheel but in a manner that is optimised for the driver. In particular, the most used portions of the rim 100 are rapidly heated.

Whilst specific embodiments of the present invention have been described above, it will be appreciated that departures from the described embodiments may still fall within the scope of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A steering wheel comprising:
    a first electrical circuit including a first heating element disposed adjacent to a 3 o'clock position of a steering wheel, a second heating element disposed adjacent to a 9 o'clock position of the wheel, and a positive temperature coefficient thermistor in series with and heated by one of the first and second heating elements; and
    a second electrical circuit parallel with the first electrical circuit and including a third heating element disposed at a 6 o'clock position of the wheel, a fourth heating element disposed at a 12 o'clock position of the wheel, and a negative temperature coefficient thermistor in series with one of the third and fourth heating elements and heated by one of the first and second heating elements.

2. The steering wheel of claim 1, wherein the positive temperature coefficient thermistor and the negative temperature coefficient thermistor are heated by the same heating element.

3. The steering wheel of claim 1, wherein the second electrical circuit further includes, in series, a second positive temperature coefficient thermistor heated by one of the third and fourth heating elements.

4. The steering wheel of claim 1, wherein the first and second electrical circuits are parts of a heater mat applied to an outer surface of the steering wheel.

5. The steering wheel of claim 4, wherein the heater mat covers a rim of the steering wheel.

6. A steering wheel comprising:
    a first circuit including, in series, a first heating element contacting a first circumferential portion of a steering wheel and a positive temperature thermistor heated by the first element; and
    a second circuit including, in series, a second heating element at a 6 o'clock position and a third heating element at a 12 o'clock position of the wheel, and a negative temperature coefficient thermistor heated by the first heating element.

7. The steering wheel of claim 6, wherein the second electrical circuit further includes, in series, a second positive temperature coefficient thermistor heated by the second heating element.

8. The steering wheel of claim 6, wherein the first electrical circuit further includes a fourth heating element located at a fourth circumferential portion of the wheel.

9. The steering wheel of claim 8, wherein one of the first and fourth elements are arranged at a 3 o'clock portion of the wheel and a remaining one of the first and fourth elements are arranged at a 9 o'clock portion of the wheel.

10. The steering wheel of claim 6, wherein at least one of the positive temperature coefficient thermistor and the negative temperature coefficient thermistor are located to measure a temperature at a surface of the wheel.

11. The steering wheel of claim 6, wherein at least one of the first and second electrical circuits includes a plurality of heating elements arranged in series.

12. The steering wheel of claim 6, wherein the first and second electrical circuits are parts of a heater mat applied to an outer surface of the steering wheel.

13. The steering wheel of claim 12, wherein the heater mat covers a rim of the steering wheel.

14. A steering wheel comprising:
    a first electrical circuit including, in series, a first heating element disposed adjacent to a 3 o'clock of a steering wheel, a second heating element disposed adjacent to a 9 o'clock position of the wheel, and a positive temperature coefficient thermistor heated by one of the first and second heating elements; and
    a second electrical circuit parallel with the first electrical circuit and including, in series, a third heating element disposed at a 6 o'clock position of the wheel, a fourth heating element disposed at a 12 o'clock position of the wheel, and a negative temperature coefficient thermistor heated by one of the first and second heating elements.

15. The steering wheel of claim 14, wherein the positive temperature coefficient thermistor and the negative temperature coefficient thermistor are heated by the same heating element.

16. The steering wheel of claim 15, wherein the second electrical circuit further includes, in series, a second positive temperature coefficient thermistor heated by one of the third and fourth heating elements.

17. The steering wheel of claim 14, wherein the first and second electrical circuits are parts of a heater mat applied to an outer surface of the steering wheel.

18. The steering wheel of claim 17, wherein the heater mat covers a rim of the steering wheel.

* * * * *